United States Patent [19]

Mathieu

[11] Patent Number: 4,983,220

[45] Date of Patent: Jan. 8, 1991

[54] METHOD AND COMPOSITION FOR ACCELERATING THE SETTING OF CEMENTS AND REMOVING EFFLORESCENT EFFECTS

[75] Inventor: Alain Mathieu, Maisons-Laffitte, France

[73] Assignee: LaFarge Fondu International, Neuilly Sur Seine, France

[21] Appl. No.: 307,396

[22] Filed: Feb. 3, 1989

[30] Foreign Application Priority Data

Feb. 8, 1988 [FR] France ............................... 88 01430

[51] Int. Cl.$^5$ .......................... C04B 7/32; C04B 7/02
[52] U.S. Cl. .................................... 106/692; 106/695; 106/703
[58] Field of Search ................ 106/100, 104, 103, 89, 106/90, 85, 692, 695, 703

[56] References Cited

U.S. PATENT DOCUMENTS

| 4,259,121 | 3/1981 | Mathieu | 106/104 |
| 4,404,031 | 1/1982 | Sudoh et al. | 106/104 |
| 4,512,809 | 4/1985 | Nielson et al. | 106/103 |
| 4,798,628 | 1/1989 | Mills et al. | 106/104 |

OTHER PUBLICATIONS

Concrete Admixtures Handbook Properties, Science and Technology V. S. Ramachandran, Noyes Publications p. 564 (1984).

Primary Examiner—William R. Dixon, Jr.
Assistant Examiner—Paul Marcantoni
Attorney, Agent, or Firm—Marvin E. Jacobs

[57] ABSTRACT

The present invention concerns a method and a composition for accelerating the setting of Portland cement, shortening the migration phase of calcium ions into the liquid phase and complexing the lime of the Portland cement, whereby the said composition is essentially formed from the following constituents: a calcium aluminates- and trihydrated alumina-based material.

10 Claims, No Drawings

METHOD AND COMPOSITION FOR ACCELERATING THE SETTING OF CEMENTS AND REMOVING EFFLORESCENT EFFECTS

The present invention concerns a method for accelerating the setting of PORTLAND cements and preventing the appearance of an efflorescent effect due to the carbonation of PORTLAND cement. It also concerns a composition for accelerating the setting of PORTLAND cement and for preventing the appearance of said efflorescent effects on the surfaces formed of concrete, mortar or coatings.

It is known that Portland cements during hydration release slaked lime known as Portlandite, which is liable to carbonate very rapidly. The formation of Portlandite is due to the hydration reaction either of tricalcic silicates (3CaO, SiO$_2$), or of bicalcic silicates (2CaO, SiO$_2$) which according to the cement-making nomenclature are represented by the respective formulae C$_3$S or C$_2$S. This hydration reaction leads to the formation of Portlandite Ca(OH)2 which appears during the first hours of hydration and is abundant after a period of 24 hours.

The hydration on process is governed by the general equation :

$$3CaO,SiO_2 + 3H_2O \quad (1,5\text{-}2)\ CaO,SiO_2,H_2O + (1,5\text{-}1)\ Ca(OH)_2$$

or, according to the cement-making nomenclature (in which CaO=C, SiO$_2$=S and H$_2$O=H)

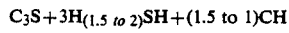

$$C_3S + 3H_{(1.5\ to\ 2)}SH + (1.5\ to\ 1)CH$$

This Portlandite Ca(OH)$_2$, when certain temperature and hygrometry conditions are satisfied, carbonates rapidly, thereby provoking the appearance of efflorescent effects on the surface of concretes, mortars and coatings. Indeed, the carbonation and the appearance of efflorescent effects occurs mainly during cold and humid weather conditions. The humidity allows migration of the lime to the surface, which renders it very sensitive to carbonation. Outside temperatures are also a favorable factor, since it is well known that a cold environment delays setting of hydraulic binders which allows, if the hygrometric conditions are satisfied, the calcium ions to migrate in liquid phase, towards the surface of the material.

This carbonation is, in fact, produced by the reaction of the lime with the atmospheric carbonic acid

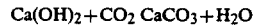

$$Ca(OH)_2 + CO_2\ CaCO_3 + H_2O$$

Ca(OH)$_2$ is very reactive, thus rendering it very sensitive to carbonation by reaction with the atmospheric CO$_2$, thereby forming on the surface of the building structures undesirable differences in coloration.

The present invention concerns a method and a composition which prevents the formation of efflorescent effects, and thus to prevents undesirable carbonation zones being produced at the surfaces formed from cement, mortar or coatings.

The method according to the invention proposes accelerating the setting of the Portland cement, in order to shorten the phase during which the calcium ions migrate in the liquid phase and complexing the lime of the Portland cement by adding to the Portland cement a composition, containing a calcium aluminate- and trihydrated alumina- based material, said composition being formed by vigorous joint grinding of the two constituents until obtention of a fineness such that 85% of the particles have a dimension smaller than 44$\mu$. In fact, the rate of oversized products of the 44$\mu$ sieve is lower than 15%.

In another embodiment of the composition according to the invention, the calcium aluminate-based material forming the said constituent has a combined Al$_2$O$_3$ content comprised between 35 and 72% and therefore a calcium aluminates content comprised between 35 and 98%.

The proportion of trihydrated alumina in the said composition is, preferably, comprised between 40 and 70%.

The trihydrated alumina can be obtained by chemical route or consist of a natural trihydrate.

Preferably, the composition contains one or several rheology regulating additives, these additives preferably consisting of sodium carbonate or trisodic citrate The calcium aluminates can be obtained from bauxites or chemical alumina issuing from the Bayer process, for example.

According to one embodiment of the invention, the proportion of the said composition in the Portland cement is comprised between 5 and 40% expressed by weight.

The present invention also concerns a composition permits acceleration of the setting of the Portland cement, to shorten the migration phase of the calcium ions in the liquid phase and to complex the lime released during hydration of the Portland cement, the said composition being mainly formed of a calcium aluminates- and trihydrated alumina-based material and the fineness of its constituents is such that 85% of the composition has a dimension smaller than 44 $\mu$.

In fact, this finely ground composition accelerates the setting of Portland cements and complexes the reactive Portlandite released during hydration to form 3CaO, Al$_2$O$_3$, 6H$_2$O or 4CaO, Al$_2$O$_3$, nH$_2$O type complex hydrates (thus either C$_3$AH or C$_4$AH$_n$ according to the cement nomenclature) which are produced instantaneously once Ca(OH)$_2$ appears.

Preferably, the proportion of trihydrated alumina in said composition is comprised between 40 and 70%, and the proportion of calcium aluminates-based material has a combined Al$_2$O$_3$ content of 35 to 72% and thus a content in calcium aluminates comprised between 35 and 98%.

In fact, the purpose of the composition according to the present invention is:
- to accelerate the setting of the Portland cement
- to provoke a reaction of the alumina with the hydrated lime progressively during formation thereof so that the migration of the Ca$^+$ ions in liquid phase towards the surface, migration which is the source of the efflorescent effect, is prevented.

The composition according to the present invention is therefore particularly adapted to forming mortars or coatings for outside walls.

The state of the art in this field concerns neither said composition nor said application. This is true of FR-A-2 295 928 which foresees contrary to the method of the invention, a heat, setting and hardening treatment under carbon dioxide atmosphere and of which only a fraction of the silica formed has a fineness smaller than 50 $\mu$.

This is also true of DE-A-2 518 799 which concerns a rapid setting binder whose granulometry is not defined and which can contain a calcium halogenaluminate.

Other aims, objects and features of the invention will appear from reading the following description given by way of non-limitative illustration. In the absence of indications to the contrary, the proportions are expressed by weight.

The measurements for determining the presence of slaked lime $Ca(OH)_2$ are performed by thermodifferential analysis and examination of the hydration products of the cement pastes possibly completed by study of the X-ray diffraction spectrums.

The Portland cements used in examples 1 to 4 are of the CPA type, containing at least 97% of clinker, not including calcium sulfate (according to French standard 15301) and in example 5 are of the CPJ type, cement of which the clinker content is at least 65% (not including calcium sulfate), the remainder consisting of one or several constituents such as blast-furnace slag, pouzzolanes, flue-dust, calcareous filler (according to French Standard NFP 15301). By the term "calcium aluminates" is meant any material containing calcium aluminates.

EXAMPLE 1

A mixture of 38% calcium aluminate having the following composition:

| combined $Al_2O_3$ | 70.4% |
|---|---|
| CaO | 28.6% |
| $SiO_2$ | 0.8% |
| $TiO_2$ | 0.1% |
| $FeO_3 + FeO$ | 0.1% | and 62% of trihydrated alumina issuing from the Bayer process, i.e. containing 100% of $Al(OH)_3$ is jointly ground in a ball-mill. The grinding time is controlled so that the fineness of the final mixture is such that the rate of oversized products of the 44 μ sieve is lower than 15%. 23% of the mixture thus obtained, forming the composition according to the invention is mixed with 77% of Portland cement containing at least 0.7% of clinker having the following composition:

| $SiO_2$ | 22.65% |
|---|---|
| $FeO_3$ | 0.26% |
| $Al_2O_3$ | 2.95% |
| CaO | 67.32% |
| MgO | 0.54% |
| $SO_3$ | 2.51% |
| $CO_2$ | 0.77% |
| P.F. | 1.07% |
| $K_2O$ | 0.70% |
| $NaH_2O$ | 0.26% |

The mineralogical composition of this Portland cement clinker is the following

| $3CaO, SiO_2 (C_3S)$ | 53.3% |
|---|---|
| $2CaO, SiO_2 (C_2S)$ | 24.6% |
| $3CAO, Al_2O_3 (C_3A)$ | 7.4% |
| $4CaO, Al_2O_3 (C_4AF)$ | 0.8% |
| minor compounds | 13.9% |

A siliceous sand mortar containing part of the mixture of Portland cement and of the composition thus obtained is combined with two parts of sand; the setting of the mortar is measured by means of the VICAT needle method; the following results were obtained for a water/binder ratio of 0.4: setting time:

| beginning of setting | 14 mn |
|---|---|
| end of setting | 19 mn |
| mechanical resistance in compression after 30 minutes | 1.3 MPa |

In fact, examination by thermodifferential analysis on the pure cement paste constituted by 23% of the mixture of calcium aluminate- and hydrated alumina-based material and 77% of above-mentioned Portland cement, diluted with 20% of water, does not show any presence of $Ca(OH)_2$ after a two hour period and at the end of 24 hours after mixing.

EXAMPLE 2

This example is performed using the same materials as those of example 1 but in different proportions, namely 40% of the mixture of calcium aluminate and trihydrated alumina and 60% of Portland cement.

The tests carried out according to the same procedures as those defined in example 1 gave the following results:

| setting: | |
|---|---|
| beginning | 6 mn |
| end | 9 mn |
| resistance in compression at 30 minutes | 2.1 MPa |

In the same way, thermodifferential analysis has not shown the presence of $Ca(OH)_2$ at the end of the 2-hour and the 24-hour period after mixing.

EXAMPLE 3

This example is performed using the same materials as those of examples 1 and 2 but adding the following rheology adjusting agents:

| sodium carbonate | 0.3% |
|---|---|
| trisodic citrate | 0.20% |

The tests performed under the same conditions as those of examples 1 and 2 have led to the following results:

| setting: | |
|---|---|
| beginning | 15 mn |
| end | 19 mn |
| resistance to compression after 2 hours | 5.8 MPa |

Thermodifferential analysis has not allowed to detect traces of Portlandite 2 hours and 24 hours after mixing.

EXAMPLE 4

A mixture of 42% calcium aluminates having the following composition:

| combined $AL_2O_3$ | 39.0% |
|---|---|
| CaO | 37.5% |
| $SiO_2$ | 4.3% |
| $TiO_2$ | 2.8% |
| $Fe_2O_3 + FeO$ | 16.4% | and 58% of dry trihydrated bauxite of the Australian Weipa type bauxite having the following composition:

| | |
|---|---|
| alumina trihydrate | 61.9% |
| alumina monohydrate | 14.9% |
| impurities | 23.2% | is jointly ground to such a fineness that the rate of oversized products for the 44 $\mu$ sieve is lower than 15%. 25% of the mixture thus obtained, forming the composition according to the invention, is mixed with 75% of a Portland cement whose chemical composition is the following:

| | |
|---|---|
| $SiO_2$ | 23.78% |
| $Fe_2O_3$ | 2.22% |
| $Al_2O_3$ | 2.71% |
| CaO | 66.78% |
| MgO | 0.81% |
| $SO_3$ | 2.02% |
| $CO_2$ | 0.36% |
| P.F. | 0.89% |
| $K_2O$ | 0.31% |
| $Na_2O$ | 0.12% |

The mineralogical composition of the Portland cement clinker is the following:

| | |
|---|---|
| $3CaO, SiO_2$ ($C_3S$) | 62.1% |
| $2CaO, SiO_2$ ($C_2S$) | 21.9% |
| $3CaO, Al_2O_3$ ($C_3A$) | 3.4% |
| $4CAO, Al_2O_3, Fe_2O_3$ ($C_4AF$) | 6.8% |
| minor compounds | 5.8% |

Thereafter, 0.5% of trisodic citrate is added, expressed with respect to the total weight of the said composition and of the Portland cement.

A sand mortar is prepared containing one part of the mixture of the said composition, of the above-mentioned cement and of the trisodic citrate in the above-mentioned proportions with two parts of sand and the following properties are measured:

| setting | |
|---|---|
| beginning | 60 mn |
| resistance: | |
| after 6 hours | 4.5 MPa |
| after 24 hours | 16 MPa |

Thermodifferential analysis does not reveal any trace of Portlandite ($Ca(OH)_2$) 2 hours and 24 hours after mixing.

EXAMPLE 5

A mixture of 42% calcium aluminates having the following composition:

| | |
|---|---|
| combined $Al_2O_3$ | 50.5% |
| CaO | 37.6% |
| $SiO_2$ | 5.1% |
| $TiO_2$ | 2.6% |
| $FeO_3 + FeO$ | 2.5% |
| minor compounds | 1.7% | and 58% of Bayer alumina trihydrate to 100% of Al-$(OH)_3$ is jointly ground fine enough so that 85% of the mixture passes through a 44 $\mu$ sieve.

18% of the mixture thus obtained forming a composition according to the invention is mixed with 82% of Portland cement containing a maximum of 35% calcareous filler. The chemical composition of the Portland cement without calcareous filler is the following:

| | |
|---|---|
| $SiO_2$ | 26.37% |
| $Fe_2O_3$ | 1.68% |
| $Al_2O_3$ | 4.75% |
| CaO | 56.84% |
| MgO | 1.60% |
| $SO_3$ | 2.79% |
| $CO_2$ | 1.53% |
| P.F. | 3.12% |
| $K_2O$ | 0.85% |
| $Na_2O$ | 0.47% |

The mineralogical composition of the Portland cement clinkers is the following:

| | |
|---|---|
| $3CaO, SiO_2$ | 60.3% |
| $2CaO, SiO_2$ | 24% |
| $3CaO, Al_2O_3$ | 5.9% |
| $4CaO, Al_2O_3, Fe_2O_3$ | 2.3% |
| minor compounds | 7.5% |

The hydraulic properties determined on a mortar formed from part of the mixture of the said composition and of above-mentioned Portland cement and two parts of sand are the following:

| | |
|---|---|
| beginning of setting | 30 mn |
| mechanical resistance | |
| after 6 hours | 4.8 MPa |
| after 24 hours | 12 MPa |

No trace of $Ca(OH)_2$ is detected by thermodifferential analysis after 2 hours and 24 hours.

It is well understood that the present invention is in no way limited to the embodiments described and represented herein-above, but can be adapted to numerous alternatives available to those skilled in the art, without departing from the scope and spirit of the invention.

I claim:

1. Process for accelerating the setting of Portland cement, shortening the migration phase of the calcium ions in the liquid phase and complexing the lime released during hydration of the Portland cement, which consists in adding to the Portland cement 5–40 percent by weight of a composition consisting essentially of trihydrated alumina of natural origin and a calcium aluminates based material, the said composition being formed by vigorous joint grinding of the two constituents such that 85% of the particles have a dimension smaller than 44 u; and wherein the proportion of trihydrated alumina in said material is between 40 and 70%, the calcium aluminates-based material has a combined $Al_2O_3$ content between 35 and 72% and a calcium aluminates content between 35 and 98%; and wherein the sulfate content is no more than about 2.79%.

2. Composition for accelerating the setting of Portland cement, to shorten the migration phase of the calcium ions in the liquid phase and to complex the lime released during hydration of the Portland cement, consisting essentially of 5–40 percent by weight of trihydrated alumina of natural origin and a calcium aluminates-based material which are jointly ground such that 85% of its constituents pass through a 44 u sieve; and wherein the calcium aluminate-based material has a combined $Al_2O_3$ content between 35 and 72%, and a calcium aluminates content between 35 and 98% and the proportion of trihydrated alumina in said material is between 40 and 70%; and wherein the sulfate content is no more than about 2.79%;

the remainder of the composition consisting essentially of Portland cement.

3. Process according to claim 1, wherein the calcium aluminate proportion in the said composition is comprised between 30 and 60%.

4. Process according to claim 1, wherein the calcium aluminates are obtained from bauxites or alumina derived from the Bayer process.

5. Process according to claim 1, wherein the said composition contains rheology adjusting additives selected from the group consisting of sodium carbonate and trisodic citrate.

6. Composition according to claim 2, wherein the calcium aluminates-based material has a combined $Al_2O_3$ content comprised between 35 and 72%, and therefore a calcium aluminates content comprised between 35 and 98%.

7. Composition according to claim 2, wherein the proportion of alumina trihydrated in the said composition is comprised between 40 and 70%.

8. Composition according to claim 7, wherein it contains rheology adjusting additives selected from the group consisting of sodium carbonate or trisodic citrate.

9. Composition according to claim 2, wherein the calcium aluminates can be obtained from bauxites or alumina derived from the Bayer process.

10. Composition according to claim 2, wherein the trihydrated alumina can be obtained by chemical route or consist of a natural trihydrate.

* * * * *